(12) United States Patent
Ting et al.

(10) Patent No.: US 7,330,227 B2
(45) Date of Patent: Feb. 12, 2008

(54) TRANSFLECTIVE LIQUID CRYSTAL DISPLAY DEVICE

(76) Inventors: Dai-Liang Ting, 2Fl., No. 13-3, Alley 10, Lane 155, Sec. 2, Guangfu Rd., Hsinchu City (TW) 300; Chi-Jain Wen, 11Fl., No. 123-9, Lane 89, Sec. 1, Guangfu Rd., Hsinchu City (TW) 300; Kuang-Lung Kuo, 4F., No. 140, Shihjian Rd., Jhongli City, Taoyuan County, 320 (TW); Sheng-Shiou Yeh, No. 76, Lin 9, Shueiwei Li, Houlung Jen, Miaoli (TW); Tzu-Seng Yang, 4Fl., No. 61, Daming Rd., Judung Jen, Hsinchu (TW)

( * ) Notice: Subject to any disclaimer, the term of this patent is extended or adjusted under 35 U.S.C. 154(b) by 190 days.

(21) Appl. No.: 10/814,393

(22) Filed: Mar. 31, 2004

(65) Prior Publication Data
US 2004/0201804 A1 Oct. 14, 2004

(30) Foreign Application Priority Data
Apr. 9, 2003 (TW) .............................. 92108097 A

(51) Int. Cl.
*G02F 1/1335* (2006.01)
(52) U.S. Cl. ....................................... 349/106; 349/114
(58) Field of Classification Search ................ 349/114, 349/106, 113; 430/7
See application file for complete search history.

(56) References Cited

U.S. PATENT DOCUMENTS

| | | | | |
|---|---|---|---|---|
| 6,147,728 A * | 11/2000 | Okumura et al. | ........... | 349/106 |
| 6,812,978 B2 * | 11/2004 | Kim et al. | .................. | 349/106 |
| 6,927,819 B2 * | 8/2005 | Jeong | ......................... | 349/114 |
| 7,072,012 B2 * | 7/2006 | Jeong et al. | ................ | 349/114 |
| 7,102,717 B2 * | 9/2006 | Chang et al. | ............... | 349/138 |
| 7,126,662 B2 * | 10/2006 | Choi et al. | .................. | 349/155 |
| 2002/0003596 A1 | 1/2002 | Kim | | |
| 2002/0113927 A1 | 8/2002 | Ha et al. | | |
| 2004/0135945 A1 * | 7/2004 | Choi et al. | .................. | 349/114 |
| 2004/0145691 A1 * | 7/2004 | Kubota et al. | ............. | 349/114 |
| 2004/0165130 A1 * | 8/2004 | Ozawa et al. | ............... | 349/114 |
| 2004/0201802 A1 * | 10/2004 | Ha et al. | .................... | 349/114 |
| 2005/0213005 A1 * | 9/2005 | Murai et al. | ................ | 349/114 |

FOREIGN PATENT DOCUMENTS

| CN | 1263608 | 8/2000 |
|---|---|---|
| CN | 1410815 | 4/2003 |

* cited by examiner

*Primary Examiner*—Toan Ton
(74) *Attorney, Agent, or Firm*—Quintero Law Office

(57) ABSTRACT

A transflective liquid crystal display device has the consistent chromaticity in transmissive and reflective modes. An insulating layer is formed on a first substrate in the reflective region. A reflective layer is formed on the insulating layer. A color filter is formed on the first substrate and the reflective layer, wherein the color filter thickness in the reflective region is thinner than that in the transmissive region. A pixel electrode is formed on the color filter. A second substrate opposite the first substrate is provided. A common electrode is formed on an inner side of the second substrate. A liquid crystal layer is interposed between the first substrate and the second substrate.

29 Claims, 4 Drawing Sheets

TRANSFLECTIVE LIQUID CRYSTAL DISPLAY DEVICE

BACKGROUND OF THE INVENTION

1. Field of the Invention

The present invention relates to a liquid crystal display device, and more particularly to a transflective liquid crystal display device with different color filter thickness.

2. Description of the Related Art

Liquid crystal display (LCD) devices are widely used as displays in electronic devices such as portable computers, PDAs and cell phones. Liquid crystal display devices are classified into two types. One is transmissive type, and the other is reflective type. The former utilizes the backlight as the light source and the latter utilizes the ambient light. It is difficult to decrease the power consumption for the transmissive LCD due to the power requirements of the backlight. As for the reflective LCD, it has the advantage of power-saving under bright ambient light; unfortunately, it has a limit to show images under dark ambient light.

In order to overcome the drawbacks of these two types of LCDs, a transflective LCD is disclosed. It is capable to show images in not only transmissive mode but also reflective mode. Under bright ambient light, the backlight can be turned off, so the power consumption of the transflective LCD is lower than that of the transmissive LCD. Besides, under dark ambient light, the backlight can be turned on, so the image quality of the transflective LCD is better than that of the reflective LCD.

FIG. 1, a sectional view of a conventional transflective LCD device, helps to illustrate the operation of such devices. As shown in FIG. 1, the conventional transflective LCD device includes a lower substrate 100 (also referred to as an array substrate), an upper substrate 160 and an interposed liquid crystal layer 130. A common electrode 140 and a color filter 150 are formed on the upper substrate 160. An insulating layer 110 and a reflective electrode 120 are formed on the lower substrate 100, wherein the reflective electrode 120 has an opaque portion 122 and a transparent portion 124. The opaque portion 122 of the reflective electrode 120 can be an aluminum layer and the transparent portion 124 of the reflective electrode 120 can be an ITO (indium tin oxide) layer. The opaque portion 122 reflects the ambient light 170, while the transparent portion 124 transmits light 180 from the backlight device (not shown). The liquid crystal layer 130 includes a plurality of spherical spacers (not shown) used to keep a fixed layer thickness or cell gap of the liquid crystal layer 130. Therefore, the transflective LCD device is capable to display in both a reflective mode and a transmissive mode.

Referring to FIG. 1, the backlight 180 penetrates the transmissive portion 124 and passes through the color filter 150 once, and the ambient light 170 reflects the light by the reflective portion 122 and passes through the color filter 150 twice. This leads to different chromaticity in the reflective and transmissive regions. U.S. Publication No. 2002/0003596A1 discloses a method of forming color filters having various thicknesses on the upper substrate, for solving the color purity issue. However, this conventional method requires additional steps to fabricate the color filters and it encounters the difficulty of assembly with lower substrate

SUMMARY OF THE INVENTION

The present invention is directed to a novel color filter structure that is easy to process and that would reduce the difference in chromaticity between the transmissive mode and the reflective mode in a transflective LCD device. In one aspect of the present invention, a novel structure is disclosed wherein the thickness of the color filter over the array substrate is made thinner at the reflective regions of the LCD device, compared to the transmissive regions. In another aspect of the present invention, a method of forming different thickness color filter regions over an array substrate is disclosed. The structure and method of the present invention comprises the provision of a thicker insulating layer that supports a thinner color filter layer in the reflective region, compared to the transmissive region.

In one embodiment, a first substrate having a transmissive region and a reflective region is provided, wherein the first substrate includes an array of thin film transistors (TFTs). An insulating layer is formed in the reflective region. A reflective layer is formed on the insulating layer. A color filter is formed on the first substrate, wherein the color filter thickness in the reflective region is thinner than that in the transmissive region. A pixel electrode is formed on the color filter. A second substrate opposite the first substrate is provided. A common electrode is formed on an inner side of the second substrate. A liquid crystal layer is interposed between the first substrate and the second substrate. Thus, the chromaticity in both transmissive and reflective modes is improved.

The present invention improves on the prior art by that the insulating layer is formed on the first substrate (array substrate or lower substrate) in the reflective region. The color filter is formed on the first substrate, wherein the color filter thickness in the reflective region is thinner than that in the transmissive region. Thus the chromaticity of the reflective mode is approaching to that of transmissive mode.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

With reference to the drawings, preferred embodiments of the invention are described below.

First Embodiment

Figure 1:
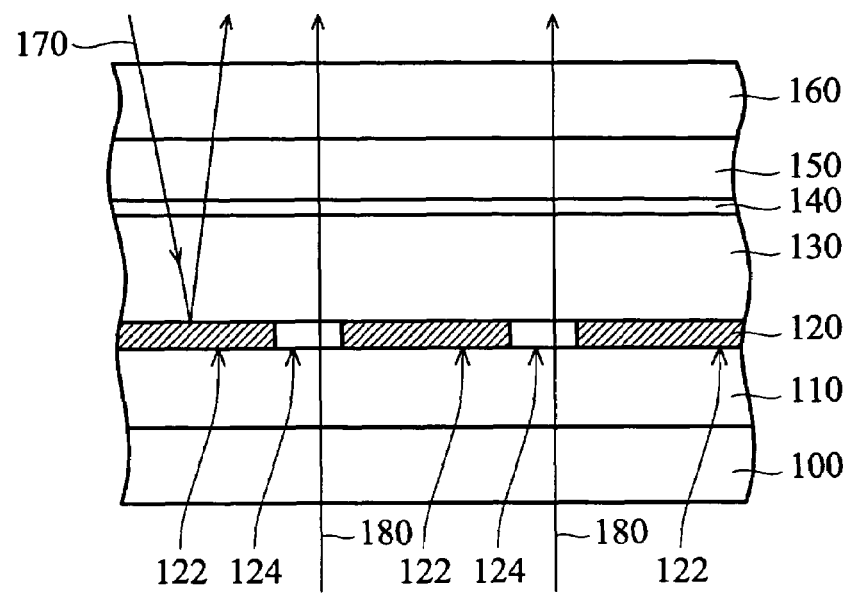
FIG. 1 is a sectional view of a transflective LCD device according to the prior art, illustrating the operation thereof.
Figure 2:
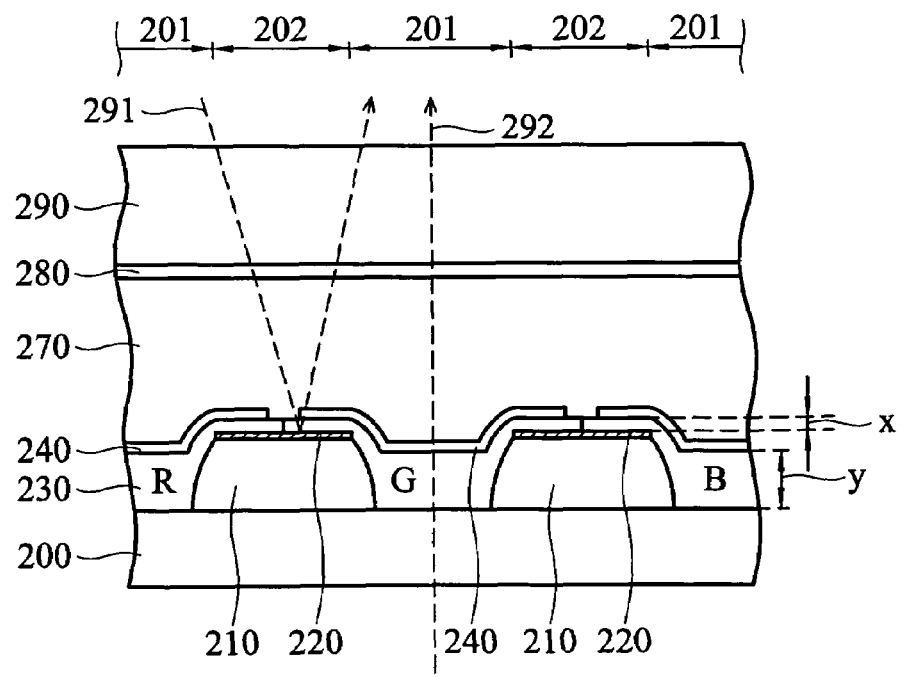
FIG. 2 is a sectional view of a transflective LCD device according to a first embodiment of the present invention.

FIG. 2 is a sectional view of a transflective LCD device according to the first embodiment of the present invention.

In FIG. 2, a first substrate 200, serving as a lower substrate, to support the various layers of the LCD device, to define a transmissive region (or area) 201 and a reflective region (or area) 202. The first substrate 200 can be a heat-resistant glass substrate, such as quartz. Also, the first substrate 200 can be a glass substrate including an array of pixel driving elements (not shown), such as an array of thin film transistors (TFTs).

In FIG. 2, by performing deposition (or coating) and etching procedures, an insulating layer 210 is then formed on the first substrate 200 in the reflective region 202. The material of the insulating layer 210 can be a photo-sensitive material comprising organic resist or resin, which can be transparent or opaque. It should be noted that, in order to prevent the TFT array from damage and improve planarization, a transparent insulating layer (not shown), such as $SiO_2$, can be formed on the entire surface of the first substrate 200.

In FIG. 2, by performing deposition and etching procedures, a reflective layer 220 is formed on the insulating layer 210 in the reflective region 202. The reflective layer 220 can be any of reflective materials such as aluminum, aluminum alloy or silver. Alternatively, the insulating layer 210 may be of a reflective material, in which case, the reflective layer 220 may be omitted. Still alternatively, the insulating layer 210 may have a reflective surface (e.g., a polished surface).

In FIG. 2, a color filter layer 230 having various thicknesses ("x" and "y") is formed on the first substrate 200 and the reflective layer 220 by, for example, a pigment dispersion method, an inkjet method or others. This step is called a COA (color filter on array) process. The color filter layer 230 may have three color regions respectively for red (R), green (G) and blue (B). It should be noted that, by means of controlling in part the thickness of the insulating layer 210 and the viscosity of the color resist for forming the color filter layer 230, the color filter 230 thickness in the reflective region 202 can be adjusted to be thinner than that in the transmissive region 201 in the COA process. It is preferred that the ratio of "x" to "y" is about 1/1.2 to 1/2, wherein "x" is the color filter 230 thickness in the reflective region 202 and "y" is the color filter 230 thickness in the transmissive region 201. In addition, the surface of the color filter 230 in the reflective region 202 can be adjusted to be higher than that in the transmissive region 201 by controlling the viscosity of the color resist (the pigment of the color filter) and the thickness of the insulating layer 210. Thus, a dull cell gap structure can be obtained after the subsequent processes (i.e., the thickness of the liquid crystal layer 270 varies from one thickness at the reflective region to another thickness at the transmissive region).

In FIG. 2, a conformal pixel electrode 240 is formed on part of the color filter 230. The pixel electrode 240 can be any of transparent conductive materials such as ITO (indium tin oxide) or IZO (indium zinc oxide).

In FIG. 2, a second substrate 290, such as glass, opposite the first substrate 200 is provided. The second substrate 290 serves as an upper substrate. Then, a common electrode 280 is formed on an inner side of the second substrate 290. The common electrode 280 may be an ITO or IZO layer.

In FIG. 2, liquid crystal molecules fill a space between the first substrate 200 and the second substrate 290 to form the liquid crystal layer 270.

According to the first embodiment, referring to FIG. 2, for a reflective mode of the transflective LCD device of the present invention, an ambient light 291 from an exterior light source (not shown) passes through the color filter layer 230 having the thickness "x" in the reflective region 202 twice. For a transmissive mode of the transflective LCD device of the present invention, a backlight 292 from a backlight source (not shown) passes through the color filter layer 230 having the thickness "y" in the transmissive region 201 once. Since the thickness "x" is thinner than the thickness "y" (for example, x/y=1/1.2~1/2), the total passage of the ambient light 291 passing through the color filter layer 230 is similar to that of the backlight 292. Thus the chromaticity of the reflective mode is concordant with that of the transmissive mode. It is noted that by controlling the thickness difference of the color filter 230 at the reflective region 202 and the transmissive region 201, the overall chromaticity for the two regions may be controlled to the desired design point, which may be substantially the same chromaticity, or different chromaticity by a desired difference.

Second Embodiment

Figure 3:
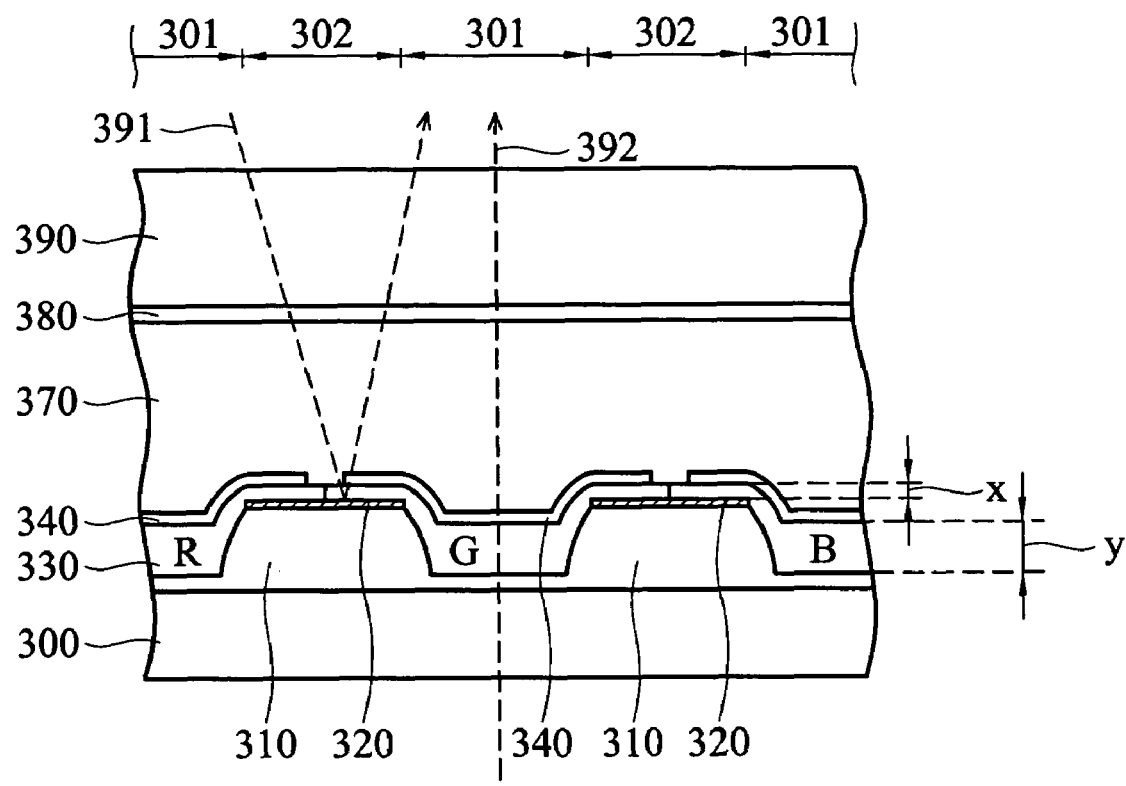
FIG. 3 is a sectional view of a transflective LCD device according to a second embodiment of the present invention.

FIG. 3 is a sectional view of a transflective LCD device according to the second embodiment of the present invention.

In FIG. 3, a first substrate 300, serving as a lower substrate, to support the various layers of the LCD device, to define a transmissive region (or area) 301 and a reflective region (or area) 302. The first substrate 300 can be a heat-resistant glass substrate, such as quartz. Also, the first substrate 300 can be a glass substrate including an array of pixel driving elements (not shown), such as an array of thin film transistors (TFTs).

In FIG. 3, by performing deposition (or coating) and partial etch back procedures, a transparent insulating layer 310 is then formed on the first substrate 300 in the transmissive region 301 and the reflective region 302, different from the insulating layer 210 only formed in the reflective region 202 in the first embodiment. The material of the transparent insulating layer 310 can be $SiO_2$ or photo-sensitive material comprising organic resist or resin. It should be noted that the thickness of the transparent insulating layer 310 in the reflective region 302 is thicker than that in the transmissive region 301. For example, the ratio of the transparent insulating layer 310 thickness in the reflective region 302 to that in the transmissive region 301 is about 2/1 to 10/1.

In FIG. 3, by performing deposition and etching procedures, a reflective layer 320 is formed on the transparent insulating layer 310 in the reflective region 302. The reflective layer 320 can be any of reflective materials such as aluminum, aluminum alloy or silver.

In FIG. 3, a color filter layer 330 having various thicknesses ("x" and "y") is formed on the transparent insulating layer 310 and the reflective layer 320 by, for example, a pigment dispersion method, an inkjet method or others. This step is called a COA (color filter on array) process. The color filter layer 330 may have three color regions respectively for red (R), green (G) and blue (B). It should be noted that, by means of controlling in part the thickness of the insulating layer 310 and the viscosity of the color resist for forming the color filter layer 330, the color filter 330 thickness in the reflective region 302 can be adjusted to be thinner than that in the transmissive region 301 in the COA process. It is preferred that the ratio of "x" to "y" is about 1/1.2 to 1/2, wherein "x" is the color filter 330 thickness in the reflective region 302 and "y" is the color filter 330 thickness in the transmissive region 301. In addition, the surface of the color filter 330 in the reflective region 302 can be adjusted to be higher than that in the transmissive region 201 by controlling the viscosity of the color resist (the pigment of the color filter) and the thickness of the insulating layer 310. Thus, a dull cell gap structure can be obtained after the subsequent processes (i.e., the thickness of the liquid crystal layer 370 varies from one thickness at the reflective region to another thickness at the transmissive region).

In FIG. 3, a conformal pixel electrode 340 is formed on part of the color filter 330. The pixel electrode 340 can be any of transparent conductive materials such as ITO (indium tin oxide) or IZO (indium zinc oxide).

In FIG. 3, a second substrate 390, such as glass, opposite the first substrate 300 is provided. The second substrate 390 serves as an upper substrate. Then, a common electrode 380 is formed on an inner side of the second substrate 390. The common electrode 380 may be an ITO or IZO layer.

In FIG. 3, liquid crystal molecules fill a space between the first substrate 300 and the second substrate 390 to form the liquid crystal layer 370.

According to the second embodiment, referring to FIG. 3, for a reflective mode of the transflective LCD device of the present invention, an ambient light 391 from an exterior light source (not shown) passes through the color filter layer 330 having the thickness "x" in the reflective region 302 twice. For a transmissive mode of the transflective LCD device of the present invention, a backlight 392 from a backlight source (not shown) passes through the color filter layer 330 having the thickness "y" in the transmissive region 301 once. Since the thickness "x" is thinner than the thickness "y" (for example, x/y=1/1.2~1/2), the total passage of the ambient light 391 passing through the color filter layer 330 is similar to that of the backlight 392. Thus, the chromaticity of the reflective made is concordant with that of the transmissive mode. It is noted that by controlling the thickness difference of the color filter 330 at the reflective region 302 and the transmissive region 301, the overall chromaticity for the two regions may be controlled to the desired design point, which may be substantially the same chromaticity, or different chromaticity by a desired difference.

Third Embodinent

Figure 4A:
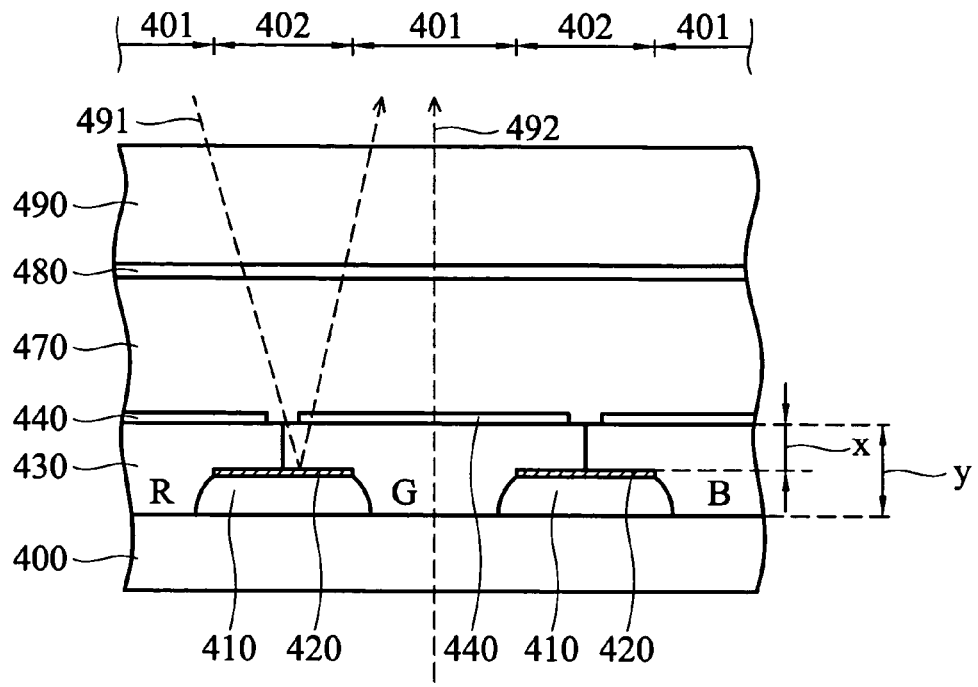
FIG. 4A is a sectional view of a transflective LCD device according to a third embodiment of the present invention.

FIG. 4A is a sectional view of a transflective LCD device according to the third embodiment of the present invention. FIG. 4A shows a transflective LCD device having a single cell gap.

In FIG. 4A, a first substrate 400, serving as a lower substrate, to support the various layers of the LCD device, to define a transmissive region (or area) 401 and a reflective region (or area) 402. The first substrate 400 can be a heat-resistant glass substrate, such as quartz. Also, the first substrate 400 can be a glass substrate including an array of pixel driving elements (not shown), such as an array of thin film transistors (TFTs).

In FIG. 4A, by performing deposition (or coating) and etching procedures, an insulating layer 410 is then formed on the first substrate 400 in the reflective region 402. The material of the insulating layer 410 can be a photo-sensitive material comprising organic resist or resin, which is transparent or opaque. It should be noted that, in order to prevent the TFTs array from damage and improve planarization, a transparent insulating layer (not shown), such as $SiO_2$, can be formed on the entire surface of the first substrate 400.

In FIG. 4A, by performing deposition and etching procedures, a reflective layer 420 is formed on the insulating layer 410 in the reflective region 402. The reflective layer 420 can be any of reflective materials such as aluminum, aluminum alloy or silver.

In FIG. 4A, a color filter layer 430 having various thicknesses ("x" and "y") is formed on the first substrate 400 and the reflective layer 420 by, for example, a pigment dispersion method, an inkjet method or others. This step is called a COA (color filter on array) process. The color filter layer 430 may have three color regions respectively for red (R), green (G) and blue (B). It should be noted that, by means of controlling in part the thickness of the insulating layer 410 and the viscosity of the color resist for forming the color filter layer 430, the color filter 430 thickness in the reflective region 402 can be adjusted to be thinner than that in the transmissive region 401 in the COA process. It is preferred that the ratio of "x" to "y" is about 1/1.2 to 1/2, wherein "x" is the color filter 430 thickness in the reflective region 402 and "y" is the color filter 430 thickness in the transmissive region 401. Also, the surface of the color filter 430 is a plane. Thus, a single cell gap structure can be obtained after the subsequent processes.

In FIG. 4A, a conformal pixel electrode 440 is formed on part of the color filter 430. The pixel electrode 440 can be any of transparent conductive materials such as ITO (indium tin oxide) or IZO (indium zinc oxide).

In FIG. 4A, a second substrate 490, such as glass, opposite the first substrate 400 is provided. The second substrate 490 serves as an upper substrate. Then, a common electrode 480 is formed on an inner side of the second substrate 490. The common electrode 480 may be an ITO or IZO layer.

In FIG. 4A, liquid crystal molecules fill a space between the first substrate 400 and the second substrate 490 to form the liquid crystal layer 470.

According to the third embodiment, referring to FIG. 4A, for a reflective mode of the transflective LCD device of the present invention, an ambient light 491 from an exterior light source (not shown) passes through the color filter layer 430 having the thickness "x" in the reflective region 402 twice. For a transmissive mode of the transflective LCD device of the present invention, a backlight 492 from a backlight source (not shown) passes through the color filter layer 430 having the thickness "y" in the transmissive region 401 once. Since the thickness "x" is thinner than the thickness "y" (for example, x/y=1/1.2~1/2), the total distance of the ambient light 491 passing through the color filter layer 430 is similar to that of the backlight 492. Thus, the chromaticity of the reflective made is concordant with that of the transmissive mode. It is noted that by controlling the thickness difference of the color filter 430 at the reflective region 402 and the transmissive region 401, the overall chromaticity for the two regions may be controlled to the desired design point, which may be substantially the same chromaticity, or different chromaticity by a desired difference.

Modification of the Third Embodiment

Figure 4B:
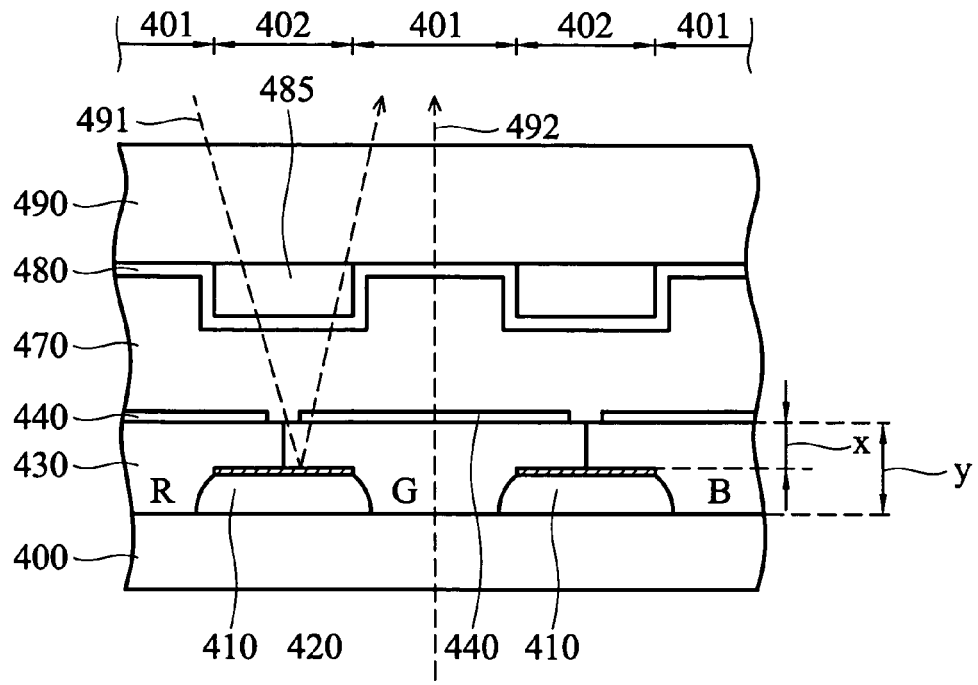
FIG. 4B is a sectional view according to a modification of the third embodiment of the present invention.

FIG. 4B is a sectional view according to a modification of the third embodiment of the present invention. FIG. 4B shows a transflective LCD device having a dual cell gap. Elements in FIG. 4B repeated from FIG. 4A use the same reference numbers. Additionally, because part of the processes and the materials of the parts in the modification are the same as the above, the description of the processes and the materials are omitted.

The modification is to form a transparent layer 485 on the inner side of the second substrate 490 in the reflective region 402. The transparent layer 485 may be $SiO_2$ or organic resin. Then, a common electrode 480 is conformally formed on the transparent layer 485 and the second substrate 490. Thus, a transflective LCD device having a dual cell gap is obtained.

The present invention provides a transflective liquid crystal display device implementing a color filter having various thicknesses on an array substrate (or lower substrate). According to the present invention, the total passage of the ambient light passing through the color filter layer is similar to that of the backlight, or can be controlled in a way to offset for other factors (e.g., other layers in the structure affecting chromaticity) to achieve an overall uniform chromaticity across reflective and transmissive regions, or achieve a specific chromaticity relationship between reflective and transmissive regions. Thus, the chromaticity of the reflective mode is approaching to that of the transmissive mode.

Figure 5:
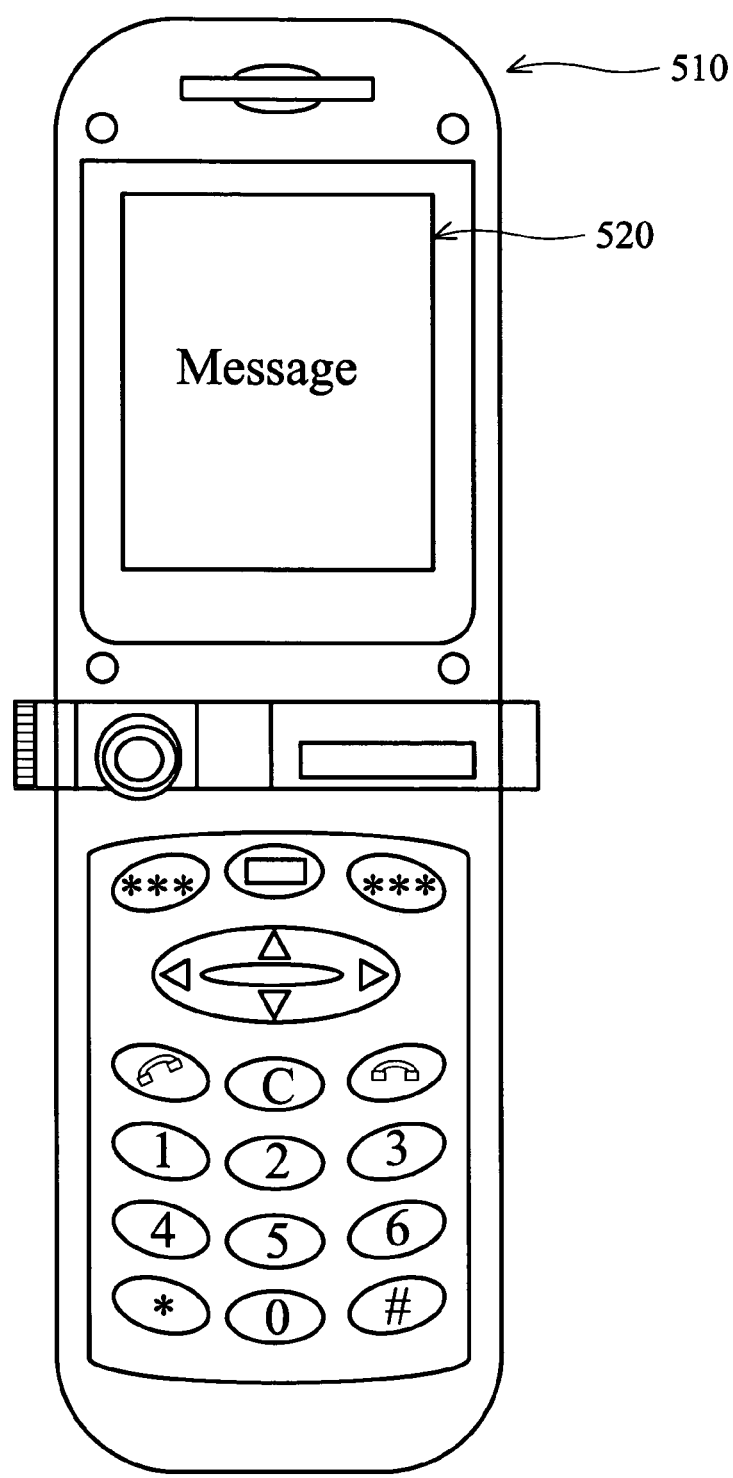
FIG. 5 is a schematic diagram of an electronic device incorporating a transflective LCD device of the present invention.

FIG. 5 is a schematic diagram of an electronic device 510 incorporating a transflective LCD 520 of the present invention. The electronic device 510 can be a mobile phone, a hand-held computer and others. A representative mobile phone is shown in FIG. 5. Even so, the teachings may be further applied to any form of display device with the transflective LCD 520. The electronic device 510 includes the transflective LCD 520 of the present invention, control electronics (such as ICs and others, not shown) operatively coupled to the transparent LCD 520 and other components (such as keypad). The control electronics are used to control the transparent LCD 520 to display an image in accordance with display data.

Finally, while the invention has been described by way of example and in terms of the above, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A color filter on array substrate, comprising:
   a substrate;
   an insulating layer formed on selected regions on the substrate, the insulating layer having a reflective top surface; and
   a color filter over the substrate, including at least a first color pigment and a second color pigment, the first color pigment having a first portion covering a first area of the insulating layer at the selected regions and a second portion on the substrate, the second color pigment covering at least a second area of the insulating layer, wherein a thickness of the first portion of the color pigment is thinner than that of the second portion of the color pigment and the first color pigment contacts the second color pigment on the reflective top surface.

2. The color filter on array substrate according to claim 1, wherein the insulating layer includes a reflective layer having a reflective top surface.

3. The color filter on array substrate according to claim 1, wherein the insulating layer does not extend beyond the selected regions on the substrate, and the selected regions generally define reflective regions on the substrate and the regions outside the selected regions generally define transmissive regions on the substrate.

4. The color filter on array substrate according to claim 1, wherein the insulating layer extends beyond the selected regions on the substrate, and the selected regions generally define reflective regions on the substrate and the regions outside the selected regions generally define transmissive regions on the substrate.

5. The color filter on array substrate according to claim 1, further comprising:
   a pixel electrode formed on the color filter.

6. A transflective liquid crystal display device, comprising:
   a color filter on an array substrate, comprising:
   a first substrate;
   an insulating layer formed on selected regions on the first substrate, the insulating layer having a reflective top surface; and
   the color filter over the first substrate, including at least a first color figment and a second color pigment, the first color pigment having a first portion covering a first area of the insulating layer at the selected regions and a second portion on the first substrate, the second color pigment covering at least a second area of the insulating layer, wherein a thickness of the first portion of the color pigment is thinner than that of the second portion of the color pigment and the first color pigment contacts the second color pigment on the reflective top surface;
   a liquid crystal element supported on the color filter on the array substrate; and
   electrodes operatively coupled to the liquid crystal element.

7. The transflective liquid crystal display device according to claim 6, wherein the electrodes comprise a pixel electrode and a common electrode.

8. The transflective liquid crystal display device according to claim 6, further comprising:
   a second substrate opposite the first substrate, wherein the first and second substrates sandwich therebetween the liquid crystal element, electrodes, the insulating layer and the color filter.

9. The transflective liquid crystal display device according to claim 6, wherein the insulating layer includes a reflective layer having a reflective top surface.

10. The transflective liquid crystal display device according to claim 6, wherein the insulating layer does not extend beyond the selected regions on the first substrate, and the selected regions generally define reflective regions on the first substrate and the regions outside the selected regions generally define transmissive regions on the first substrate.

11. The transflective liquid crystal device according to claim 10, wherein the ratio of the color filter thickness in the reflective region to that in the transmissive region is 1/1.2 to 1/2.

12. The transflective liquid crystal display device according to claim 6, wherein the insulating layer extends beyond the selected regions on the first substrate, and the selected regions generally define reflective regions on the first substrate and the regions outside the selected regions generally define transmissive regions on the first substrate.

13. The transflective liquid crystal display device according to claim 12, further comprising:
   a reflective layer formed on the insulating layer in the reflective regions, wherein the color filter formed on the insulating layer and the reflective layer;

a pixel electrode formed on the color filter;
a second substrate opposite the first substrate;
a transparent electrode formed on an inner side of the second substrate; and the liquid crystal interposed between the first substrate and the second substrate.

14. The transflective liquid crystal device according to claim 13, wherein the ratio of the color filter thickness in the reflective region to that in the transmissive region is 1/1.2 to 1/2.

15. The transflective liquid crystal device according to claim 13, wherein a surface of the color filter is higher in the reflective region than in the transmissive region.

16. The transflective liquid crystal device according to claim 13, wherein a surface of the color filter is substantially the same height in the reflective region and in the transmissive region.

17. The transflective liquid crystal device according to claim 13, wherein the insulating layer is thinner in transmissive region than in the reflective region.

18. The transflective liquid crystal device according to claim 13, wherein the ratio of the insulating layer thickness in the reflective region to that in the transmissive region is 2/1 to 10/1.

19. The transflective liquid crystal device according to claim 12, wherein the ratio of the insulating layer thickness in the reflective region to that in the transmissive region is 2/1 to 10/1.

20. An electronic device, comprising:
a liquid crystal display device comprising a color filter on an array substrate, wherein the array substrate comprises:
a first substrate;
an insulating layer formed on selected regions on the first substrate, the insulating layer having a reflective top surface;
a color filter over the first substrate, including at least a first color pigment and a second color pigment, the first color pigment having a first portion covering a first area of the insulating layer at the selected regions and a second portion on the first substrate, the second color pigment covering at least a second area of the insulating layer, wherein a thickness of the first portion of the color pigment is thinner than that of the second portion of the color pigment and the first color pigment contacts the second color pigment on the reflective top surface;
a liquid crystal element supported on the color filter on the array substrate; and
electrodes operatively coupled to the liquid crystal element; and
control electronics operatively coupled to the liquid crystal display device, controlling the liquid crystal display device to display an image in accordance with display data.

21. A process of fabricating a color filter on array substrate, comprising the steps of:
providing a first substrate;
forming an insulating layer on selected regions on the first substrate, the insulating layer having a reflective top surface; and
forming a color filter over the first substrate, including at least a first color pigment and a second color pigment, the first color pigment having a first portion covering a first area of the insulating layer at the selected regions and a second portion on the first substrate, the second color pigment covering at least a second area of the insulating layer, wherein a thickness of the first portion of the color pigment is thinner than that of the second portion of the color pigment and the first color pigment contacts the second color pigment on the reflective top surface.

22. The process according to claim 21, wherein the insulating layer includes a reflective layer having a reflective top surface.

23. The process according to claim 21, wherein the insulating layer does not extend beyond the selected regions on the substrate, and the selected regions generally define reflective regions on the substrate and the regions outside the selected regions generally define transmissive regions on the substrate.

24. The process according to claim 21, wherein the insulating layer extends beyond the selected regions on the substrate, and the selected regions generally define reflective regions on the substrate and the regions outside the selected regions generally define transmissive regions on the substrate.

25. The process according to claim 21, further comprising the step of:
forming a pixel electrode on the color filter.

26. A process of fabricating a transflective liquid crystal display device, comprising the steps of:
forming a color filter on an array substrate, comprising the steps of:
providing a first substrate;
forming an insulating layer on selected regions on the first substrate, the insulating layer having a reflective top surface; and
forming a color filter over the first substrate, including at least a first color pigment and a second color pigment, the first color pigment having a first portion covering a first area of the insulating layer at the selected regions and a second portion on the first substrate, the second color pigment covering at least a second area of the insulating layer, wherein a thickness of the first portion of the color pigment is thinner than that of the second portion of the color pigment and the first color pigment contacts the second color pigment on the reflective top surface;
providing a liquid crystal element on the color filter on the array substrate; and
providing electrodes operatively coupled to the liquid crystal element.

27. The process according to claim 26, wherein the insulating layer includes a reflective layer having a reflective top surface.

28. The process according to claim 26, wherein the insulating layer does not extend beyond the selected regions on the first substrate, and the selected regions generally define reflective regions on the first substrate and the regions outside the selected regions generally define transmissive regions on the first substrate.

29. The process according to claim 26, wherein the insulating layer extends beyond the selected regions on the first substrate, and the selected regions generally define reflective regions on the first substrate and the regions outside the selected regions generally define transmissive regions on the first substrate.

* * * * *